United States Patent [19]

König et al.

[11] Patent Number: 4,727,095
[45] Date of Patent: Feb. 23, 1988

[54] RIGID FOAMS DEFORMABLE BY HEAT AND PROCESSES FOR THEIR PREPARATION AND USE

[75] Inventors: Eberhard König, Floersheim; Uwe F. Gronemeier, Kuerten; Karl-Josef Kraft, Leverkusen, all of Fed. Rep. of Germany

[73] Assignee: Bayer Aktiengesellschaft, Leverkusen, Fed. Rep. of Germany

[21] Appl. No.: 27,373

[22] Filed: Mar. 18, 1987

[30] Foreign Application Priority Data

Apr. 2, 1986 [DE] Fed. Rep. of Germany ....... 3610961

[51] Int. Cl.$^4$ ................................................. C08G 18/30
[52] U.S. Cl. ..................... 521/166; 264/321; 264/544; 264/319; 428/319.7; 428/319.9; 521/173; 521/174; 521/176; 528/45; 528/49; 528/62; 528/69
[58] Field of Search ............... 521/166, 173, 174, 176; 528/45, 49, 62, 69; 264/319, 321, 544; 428/319.7, 319.9

[56] References Cited

U.S. PATENT DOCUMENTS 4,129,697 12/1978 Schapel et al. ..................... 521/176
4,508,774 4/1985 Grabhoefer et al. ............... 428/220

*Primary Examiner*—Maurice J. Welsh
*Assistant Examiner*—S. A. Acquah
*Attorney, Agent, or Firm*—Gene Harsh; Joseph C. Gil; Lyndanne M. Whalen

[57] ABSTRACT

Thermoformable rigid foams are made by reacting an organic polyisocyanate with a polyol component. The polyol component includes at least one organic polyhydroxyl compound having a hydroxyl number of from 28 to 1200, a foaming agent, a catalyst and a compound which masks isocyanate groups. Preferred isocyanate masking compounds are ε-caprolactam and nonyl phenol. The foam thus obtained may then be molded and crosslinked by heating it to a temperature of from 150° to 190° C. These foams are particularly useful as interior trim for motor vehicles.

10 Claims, No Drawings

RIGID FOAMS DEFORMABLE BY HEAT AND PROCESSES FOR THEIR PREPARATION AND USE

BACKGROUND OF THE INVENTION

This invention relates to thermoformable, heat cross-linkable PUR rigid foams and to processes for their production and use.

Polyisocyanurate rigid foams suitable for use as interior trim for motor vehicles are already known. Thermoformable polyisocyanurate foams synthesized predominantly from distilled diphenylmethane-4,4'-diisocyanate, for example, are described in DE-OS No. 2,607,380. These foams are economically disadvantageous because almost 80 wt. % is composed of the relatively expensive isocyanate component.

Thermoplastic polyurethane (PUR) foams based on polyesters are described in EP No. 118,876. These foams are technically unsatisfactory for use as interior trim in motor vehicles because they are too flexible. If rigid, self-supporting molded parts are to be obtained, such foams must be reinforced with reactive resin impregnated glass mats. It is only by this additional measure that the necessary dimensional stability under heat can be imparted to the foams.

SUMMARY OF THE INVENTION

It is an object of the present invention to provide a PUR foam made from inexpensive components which has good molding properties in the range of 150° C. to 190° C., which has a dimensional stability under heat of at least 95° C. and with the rigidity necessary to render it self-supporting.

It is also an object of the present invention to provide processes for making and using such foams.

These and other objects which will be apparent to those skilled in the art are accomplished by reacting an organic polyisocyanate with a polyol component. The polyol component includes at least one organic polyhydroxyl compound having a hydroxyl number of from 28 to 1200, a foaming agent and from 1 to 25 wt. % (based on total weight of polyol component) of a compound which masks isocyanate groups. Conventional additives such as a foaming agent, a foam stabilizer and a catalyst also may be included in the polyol component. This reaction may be carried out in a laminator. This reaction product may be molded and cross-linked by applying heat.

DETAILED DESCRIPTION OF THE INVENTION

The present invention relates to PUR rigid foams which can be both molded and cross-linked by heat. These foams are obtainable by the reaction of an organic polyisocyanate with a polyol component. The polyol component includes at least one organic polyhydroxyl compound having a hydroxyl number of from 28 to 1200, a foaming agent and 1 to 25 wt. %, based on the total weight of polyol component, of at least one compound which masks isocyanate groups.

The invention also relates to a process for the preparation of thermoformable PUR rigid foams in which an organic polyisocyanate is reacted with a polyol component. The polyol component includes at least one organic polyhydroxyl compound having a hydroxyl number of 28 to 1200, a blowing agent and from 1 to 25 wt. %, based on the total weight of the polyol component of at least one compound which masks isocyanate groups. Other conventional additives known to those skilled in the art may also be included in the polyol component.

The invention further relates to the use of these PUR rigid foams for the manufacture of the interior trims of motor vehicles by thermoforming at 150° to 190° C., preferably for the manufacture of inside roof linings.

The thermoformable, heat cross-linkable PUR rigid foams of the present invention are preferably produced in the form of foam panels (relatively thin, ready for use) by the reaction of the polyisocyanate component with the polyol component on a laminator. These components are generally used in proportions corresponding to an equivalent ratio of isocyanate groups in the polyisocyanate component to all isocyanate reactive groups present in the polyol component of from 1:1 to 2.0:1.

The polyisocyanate component may be composed of any known organic polyisocyanate or mixture thereof but it is preferred to use the conventional aromatic polyisocyanates which are liquid at room temperature, such as commercial TDI and MDI, including crude TDI and crude MDI and mixtures thereof. Polyisocyanates of the diphenylmethane series having a viscosity at 25° C. of about 20 to 700 mPas, in particular about 200 to 500 mPas are particularly preferred.

The polyol component is a mixture of one or more organic polyhydroxyl compounds, the known additives required for foaming and the isocyanate masking agents required in the present invention.

The compounds which may be used as the polyhydroxyl compound include the polyester and polyether polyols known to those skilled in polyurethane chemistry and mixtures thereof and chain lengthening agents within an OH number of from 28 to 1200.

Difunctional polyesters with an OH number of from 112 to 400 and propylene oxide/ethylene oxide polyether polyols having a functionality of 2 to 4 and an OH number of from 28 to 900 are preferred.

The additives required for foaming include the known foaming agents, foam stabilizers and catalysts. The foaming agent most commonly used is carbon dioxide obtained from the reaction of isocyanate groups with water. Physical foaming agents such as trichlorofluoromethane may in addition be used in minor quantities for producing certain cell structures. The known polyethers containing polydimethylsiloxane end groups may be used as foam stabilizers. The catalysts which may be used include those which are relatively odorless and can be built into the structure of the product, such as N,N-dimethylethanolamine and N-methyl-diethanolamine, or relatively non-volatile catalysts such as potassium acetate or tin(II)-octoate.

The isocyanate masking component may be any one of the compounds known to those skilled in polyurethane chemistry for masking isocyanate groups (compare Kunststoff-Handbuch, Vol. VII, Polyurethane, page 12, by Vieweg and Höchtlen, Carl-HanserVerlag,-München 1966). These compounds split off when the isocyanate adducts containing them are heated to temperatures above about 120° C. to release the isocyanate groups. Masking agents of this kind include ketoximes (such as butanone oxime), CH-acidic compounds (such as ethylacetoacetate or diethylmalonate), acid amides (such as ε-caprolactam) and phenols (e.g., nonyl phenol). These masking compounds are used in quantities of 1 to 25 wt. %, preferably 5 to 15 wt. %, based on the total polyol component. ε-Caprolactam and nonyl phenol and mixtures thereof are preferably used.

In one embodiment of the present invention, the isocyanate masking compound may be totally or partly reacted with the polyisocyanate component before the component is reacted with the polyol component.

It is preferred that this reaction of the above-described polyisocyanate and polyol components to form PUR rigid foam panels be carried out on a laminator installation. It is also preferred that the polyisocyanate and polyol components be fed to the laminator in an equivalent ratio of from 1:1 to 2:1, most preferably from 1.1:1 to 1.5:1.

Dosing and mixing of the two components may be carried out by using a known 2-component foaming machine which distributes the reactive mixture uniformly over the whole width of what will subsequently be the support material (e.g. a glass mat) by means of an oscillating applicator device. The reactive mixture, which flows off to form a film, is then covered by another support material (e.g. another glass mat or a decorative film) before it is introduced into the reactive zone of the laminator. The laminator which is maintained at a temperature of about 90° C. travels at a speed of about 12 m/min. The foaming and curing process takes place within the reactive zone which extends over a length of about 10 m. The endless foam panel obtained at the end of the laminator is trimmed at the edges and cut to size. A storable, thermoformable PUR rigid foam panel with sandwich construction constituting a so-called semifinished product is obtained.

When the foam panels are deformed by heat (e.g. preferably to form inside roof linings for motor cars), they are generally heated to 150°-190° C., preferably 180°-190° C. For example, the panels may be heated to 180°-190° C. for 2 to 4 minutes in a supporting frame in a suitably sized heating plant until the foam softens. The hot foam panels suspended in the frame then enter the cold, open mold where they are pressed (for example, for one minute) to form the required molded parts.

The advantage of the PUR rigid foams of the present invention is that they undergo an after-reaction during the stage of hot forming. This after-reaction converts the foam from a substantially thermoplastic material into a duroplastic material. This change becomes apparent when one compares the glass transition temperatures for the storage-stable foam panels and for the molded parts produced from them. The glass transition temperature of the thermoformed panel (which may be determined, for example, by the torsion vibration test according to DIN 53 445) is from 30° to 50° C. higher and borders on the region of the decomposition temperature of the PUR material, which is about 200° C.

Molded parts with a complicated structure can be reproduced very accurately with the foams according to the invention due to their relatively low softening temperature. Moreover, these molded parts have a better thermal stability at test temperatures of 95° C. or more due to the changes which they undergo in the after-reaction.

The foams of the present invention are most preferably produced from crude MDI which is commercially readily available and inexpensive.

The invention is further illustrated, but is not intended to be limited by the following examples in which all parts and percentages are by weight unless otherwise specified.

Examples

EXAMPLE 1

Polyol Formulation A:

41.5 parts by weight of a propylene oxide polyether started on propylene glycol, OH number 500

22.0 parts by weight of a propylene oxide polyether started on trimethylolpropane, OH number 875

20.0 parts by weight of a propylene oxide/ethylene oxide polyether started on propylene glycol, OH number 28

5.5 parts by weight of ε-caprolactam, corresponding to OH number 500

5.5 parts by weight of nonyl phenol, OH number 250

1.5 parts by weight of dimethylethanolamine, OH number 620

4.0 parts by weight of water, calculated OH number 6230

100.0 parts by weight of the above polyol component, OH number of mixture equal to 700 (including water) was reacted with 187.0 parts by weight of a polyphenyl-polymethylene polyisocyanate (crude MDI), "dinuclear content" about 45 wt. %, NCO content 31 wt. %, viscosity at 25° C. about 400 mPas.

The polyol component contained 11.0 wt. % of the isocyanate masking agents, ε-caprolactam and nonyl phenol.

Production and properties of the thermoformable PUR rigid foam panel 100 parts by weight of the Polyol Formulation A and 187 parts by weight of the crude MDI polyisocyanate described were mixed together in a 2-component foaming apparatus and uniformly applied in a direction transverse to the displacement of the conveyor belt to a glass mat serving as the lower covering layer which was transported with the belt. The components were dosed in proportions corresponding to an NCO/OH equivalent ratio of 1.1. The output of the foaming machine was adjusted to 8400 g/min (5470 g/min polyisocyanate and 2930 g/min polyol) because the width of the laminator was 1.40 m, the desired height of the foam was 1 cm, the desired gross density of the foam was 50 kg/m³ and the speed of transport of the laminator was 12 m/min. The reactive mixture which was discharged coalesced to form a uniform film which was blocked by a second covering layer, a decorative textile web, which moved into the laminator from above. Foam formation took place in the subsequent reaction zone which was heated to 90° C. and extended over a length of about 10 m. An endless foam panel about 1 cm in thickness which had reacted until it had a tough, rigid consistency was obtained at the end of the laminator. This panel was trimmed at the edge and cut to the length of the required parts.

The foam panel thus formed had a sandwich construction and was a firm, self-supporting semifinished material suitable for storage. It had a foam core with a gross density of 50 kg/m³ and a compression resistance of 0.47 mPa (determined by the compression test according to DIN 53 421).

The shear modulus of the foam samples described above and its damping (first derivative) was determined in the temperature range of 20° to 220° C. by the torsion vibration test according to DIN 53 445. In accordance with the damping maximum, this foam had a glass transition temperature of 150° C. Above this temperature, the foam softened and lost its mechanical strength.

Production and properties of a molded part

The sandwich panel described above (dimensions in mm: 170×135×10) was heated to 185° C. for 4 minutes by means of a contact plate of suitable size. The softened panel was then introduced by means of a supporting frame into the cold mold for a car roof lining. The mold was closed and then opened again after about 1 minute. The inside roof lining was ready for installation after a further operation in a stamping press.

The glass transition temperature (determined according to DIN 53 445) of the foam used for the car roof lining was found to be 220° C. and thus 70° C. higher than that of the semifinished panel. The foam which had thus undergone an irreversible change had an improved dimensional stability in the heat.

The dimensional stability in the heat was tested in a car roof lining which had already been installed by aging the roof construction together with the lining in an air conditioned chamber at 110° C. for 16 hours. At the end of this test, the roof lining must not have shifted upwards or downwards by more than 5 mm from its starting position at any of the nine points measured.

The roof lining described above withstood this test.

COMPARISON EXAMPLE

This example describes the properties of the foam obtained from a polyol formulation corresponding to Polyol Formulation A with the exception that the isocyanate masking agents were not included. The quantity of the materials present in this formulation were adjusted to compensate for the deleted masking agents. The comparative polyol formulation was as follows:

45.0 parts by weight of a propylene oxide polyether started on propylene glycol, OH number 500

25.0 parts by weight of a propylene oxide polyether started on trimethylolpropane, OH number 875

23.5 parts by weight of a propylene oxide/ethylene oxide polyether started on propylene glycol, OH number 28

1.0 part by weight of stabilizer OS 50 (polydimethyl polysiloxane of Bayer AG)

1.5 parts by weight of dimethylethanolamine, OH number 620

4.0 parts by weight of water, calculated OH number 620

100.0 parts by weight of the above polyol component, OH number of mixture 710 (including water) were reacted with 187.0 parts by weight of the same polyisocyanate as was used in Example 1.

The proportions of the components corresponded to an NCO/OH ratio of 1.1.

A foam test packet was prepared in accordance with the above formulation and cut up into discs 12 mm in thickness. The foam had a gross density of about 40 kg/m³. The glass transition temperature of this foam was determined by the torsion vibration test according to DIN 53 445 and found to be 190° C.

A 12 mm plate was heated to 190° C. in a contact plate heating apparatus for 4 minutes and then cold formed. The glass transition temperature of this part was found to be 200° C. and the part had cracks.

The foam described above differed from that described in Example 1 by two characteristic features. First, the comparative foam had almost identical glass transition temperatures of 190° C. and 200° C. for the freshly prepared foam and the heat pressed foam.

Second, the very high glass transition temperature of 190° C. for the freshly prepared foam which does not allow for sufficient softening, with the result that cracks form in the foam when molded.

EXAMPLE 2

Polyol Formulation B:

44.0 parts by weight of a propylene oxide polyether started on propylene glycol, OH number 500

40.6 parts by weight of a propylene oxide/ethylene oxide polyether started on trimethylol-propane, OH number 35

0.5 parts by weight of stabilizer OS 50 (polydimethyl-polysiloxane of Bayer AG)

11.0 parts by weight of ε-caprolactam, corresponding to OH number 500

3.9 parts by weight of water, calculated OH number 6230

100.0 parts by weight of the Polyol Formulation B, OH number of mixture 530 were reacted with 170.0 parts by weight of a polyphenyl-polymethylene polyisocyanate (crude MDI), isocyanate content 31 wt. %, viscosity at 25° C. about 400 mPas.

The polyol component contained 11.0 wt. % of the isocyanate masking agent, ε-caprolactam.

Production and properties of the thermoformable PUR rigid foam panel 100 parts by weight of Polyol Formulation B and 170 parts by weight of the polyisocyanate described above were worked up into PUR rigid foam panels with sandwich construction by means of a 2-component foaming machine on a laminator as described in Example 1. The proportions in which the components were used corresponded to an NCO/OH ratio of 1.3.

The self-supporting semifinished panel obtained had a foam core with a gross density of 50 kg/m³ and a compression resistance of 0.39 mPa (determined by the compression test according to DIN 53 421).

The glass transition temperature of this foam was 130° C. (determined by the torsion vibration test according to DIN 53 445).

Production and properties of the molded part

The semifinished panel with sandwich construction described above was heated to 180° C. for 4 minutes and then cold pressed for 1 minute as described in Example 1.

The glass transition temperature of this hot pressed foam had risen to 170° C. (determined according to DIN 53 445).

The conditions for dimensional stability under heat tested on the car roof lining after installation (see Example 1) are fulfilled at 95° C.

EXAMPLE 3

Polyol Formulation C 40.0 parts by weight of a propylene oxide polyether started on propylene glycol, OH number 500

40.0 parts by weight of a propylene oxide/ethylene oxide polyether started on trimethylol-propane, OH number 35

0.7 parts by weight of stabilizer OS 50 (polydimethyl siloxane of Bayer AG)

16.0 parts by weight of nonyl phenol, OH number 250

3.3 parts by weight of water 100.0 parts by weight of Polyol Formulation C, OH number of mixture 450 were reacted with 170.0 parts by weight of a polyphenyl-polymethylene polyisocyanate (crude (MDI), isocyanate content 31 wt. %, viscosity at 25° C. about 400 mPas.

The polyol component contained 16.0 wt. % of the isocyanate masking agent, nonyl phenol.

Production and properties of the thermoformable PUR rigid foam panel 100 parts by weight of Polyol Formulation C and 170 parts by weight of the polyisocyanate component (described above) were worked up into PUR rigid foam panels with sandwich construction, using a 2-component foaming machine and a laminator as described in Example 1. The components were used in proportions corresponding to an NCO/OH ratio of 1.5.

The self-supporting, storage-stable, semifinished panel obtained had a foam core with a gross density of 55 kg/m$^3$ and a compression resistance of 0.40 mPa (determined by the compression test according to DIN 53 421).

The glass transition temperature of this foam was 140° C. (determined by the torsion vibration test according to DIN 53 445).

Production and properties of the molded part

The semifinished panel described above was heated to 180° C. for 4 minutes and then cold pressed for 1 minute as described in Example 1.

The glass transition temperature of this hot pressed foam had risen to 170° C. (i.e. by 30° C.). As mentioned above, the glass transition temperature was determined as the maximum of damping of the shear modulus curve in the temperature range of 20° to 220° C. in the torsion vibration test (DIN 53 445).

The conditions for dimensional stability under heat tested on a car roof lining after installation (see Example 1) were fulfilled at 95° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoformable rigid foam which is the reaction product of
   (a) an organic polyisocyanate and
   (b) a polyol component containing
      (b1) at least one organic polyhydroxyl compound having a hydroxyl number of from 78 to 1200,
      (b2) a foaming agent, foam stabilizer and catalyst, and
      (b3) from 1 to 25 wt. % based on total weight of polyol compound (b) of at least one compound which masks isocyanate groups.

2. The foam of claim 1 in which (b1) is a difunctional polyester with an OH number of from 112 to 400.

3. The foam of claim 1 in which (b1) is a difunctional propylene oxide polyether polyol having an OH number of from 28 to 900.

4. The foam of claim 1 in which (b3) is $\epsilon$-caprolactam and/or nonyl phenol.

5. The foam of claim 1 in the form of a rigid panel.

6. A process for the production of a thermoformable rigid foam in which
   (a) an organic polyisocyanate is reacted with
   (b) a polyol component containing
      (b1) at least one organic polyhydroxyl compound having a hydroxyl number of from 28 to 1200,
      (b2) a foaming agent and catalyst, and
      (b3) from 1-25 wt. % (based on total weight of polyol component (b)) of at least one compound which masks isocyanate groups.

7. The process of claim 6 in which the reaction is carried out in a laminator to produce rigid foam panels.

8. A process for the production of an interior part of a car comprising forming the foam of claim 1 at a temperature of from 150° to 190° C.

9. The process of claim 8 in which the interior part of the car is interior trim.

10. The process of claim 8 in which the interior part is a roof lining.

* * * * *